(12) United States Patent
Meruva et al.

(10) Patent No.: US 10,747,696 B2
(45) Date of Patent: *Aug. 18, 2020

(54) AUTOMATIC MASTER-SLAVE SYSTEM AND APPROACH

(71) Applicant: Honeywell International Inc., Morris Plains, NJ (US)

(72) Inventors: Jayaprakash Meruva, Bangalore (IN); Wolfgang Schmieder, Holzgerlingen (DE); Balaji Krishnasamy, Madurai (IN); Vinay Prasad, Bangalore (IN); Yongxi Zhou, Beijing (CN); Fei Chen, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,209

(22) Filed: Apr. 9, 2019

(65) Prior Publication Data
US 2019/0236039 A1 Aug. 1, 2019

Related U.S. Application Data

(63) Continuation of application No. 14/946,640, filed on Nov. 19, 2015, now Pat. No. 10,255,212.

(51) Int. Cl.
*G01B 15/00* (2006.01)
*G06F 13/364* (2006.01)
(Continued)

(52) U.S. Cl.
CPC ............ *G06F 13/364* (2013.01); *F24F 11/30* (2018.01); *F24F 11/62* (2018.01); *G05B 15/02* (2013.01);
(Continued)

(58) Field of Classification Search
CPC .... G06F 13/364; G06F 13/4282; F24F 11/00; F24F 11/62; G05B 15/00; G05B 15/02
(Continued)

(56) References Cited

U.S. PATENT DOCUMENTS 6,575,233 B1 6/2003 Krumnow
7,924,151 B2 4/2011 Brissman et al.
(Continued)

FOREIGN PATENT DOCUMENTS

EP 2884355 A1 6/2015
WO 2012068591 A2 5/2012
(Continued)

OTHER PUBLICATIONS

Realtime Control Systems, "RTD-20 English Installation Instructions," 20 pages, prior to Jun. 17, 2015.

*Primary Examiner* — Long K Tran
(74) *Attorney, Agent, or Firm* — Seager, Tufte & Wickhem LLP

(57) ABSTRACT

An automatic master slave system and approach for coordinated control of a parameter, for example, a heating, ventilation and air conditioning condition, in an area of multiple spaces controlled by room controllers. Changing a layout of a zone/area in a building such as moving, adding or removing a door, increasing or splitting size of a room through movable walls, or by permanently removing partitions, changing offices to a conference room or vice versa, may occur. A size of a room may be altered within minutes, according to customer demand. For instance, rooms may be converted into a single room by removing partitions. The controllers that were controlling temperatures of the rooms independently earlier, may convert automatically into a master-slave configuration and now work together to control a larger room. If the large room is split into multiple rooms, the controllers may automatically revert to their previous configuration.

10 Claims, 14 Drawing Sheets

(51) Int. Cl.
  *G06F 13/42* (2006.01)
  *F24F 11/30* (2018.01)
  *F24F 11/62* (2018.01)
  *G05B 15/02* (2006.01)
  *F24F 11/54* (2018.01)

(52) U.S. Cl.
  CPC .......... *G06F 13/4282* (2013.01); *F24F 11/54* (2018.01); *G05B 2219/2642* (2013.01)

(58) Field of Classification Search
  USPC ........................................................ 700/277
  See application file for complete search history.

(56) References Cited

U.S. PATENT DOCUMENTS

| | | |
|---|---|---|
| 7,966,438 B2 | 6/2011 | Punyko et al. |
| 8,504,174 B2 | 8/2013 | Rahme et al. |
| 2009/0218977 A1 | 9/2009 | Pan et al. |
| 2012/0038458 A1 | 2/2012 | Toepke et al. |
| 2013/0236029 A1 | 9/2013 | Millington |
| 2014/0052300 A1 | 2/2014 | Matsuoka et al. |
| 2014/0343886 A1 | 11/2014 | Berinato et al. |
| 2015/0006184 A1 | 1/2015 | Marti et al. |

FOREIGN PATENT DOCUMENTS

| | | |
|---|---|---|
| WO | 2013012475 A2 | 1/2013 |
| WO | 2013028941 A1 | 2/2013 |
| WO | 2014011946 A1 | 1/2014 |

AUTOMATIC MASTER-SLAVE SYSTEM AND APPROACH

This present application is a continuation of U.S. patent application Ser. No. 14/946,640, filed Nov. 19, 2015. U.S. patent application Ser. No. 14/946,640, filed Nov. 19, 2015, now U.S. Pat. No. 10,255,212, is hereby incorporated by reference.

BACKGROUND

The present disclosure pertains to controllers and particularly to combining controllers in one way or another.

SUMMARY

The disclosure reveals an automatic master slave system and approach for coordinated control of a parameter, for example, a heating, ventilation and air conditioning condition, in an area of multiple spaces controlled by room controllers. Changing a layout of a zone/area in a building such as moving, adding or removing a door, increasing or splitting size of a room through movable walls, or by permanently removing partitions, changing offices to a conference room or vice versa, may occur. A size of a room may be altered within minutes, according to customer demand. For instance, rooms may be converted into a single room by removing partitions. The controllers that were controlling temperatures of the rooms independently earlier, may convert automatically into a master-slave configuration and now work together to control a larger room. If the large room is split into multiple rooms, the controllers may automatically revert to their previous configuration.

DESCRIPTION

Figure 1:
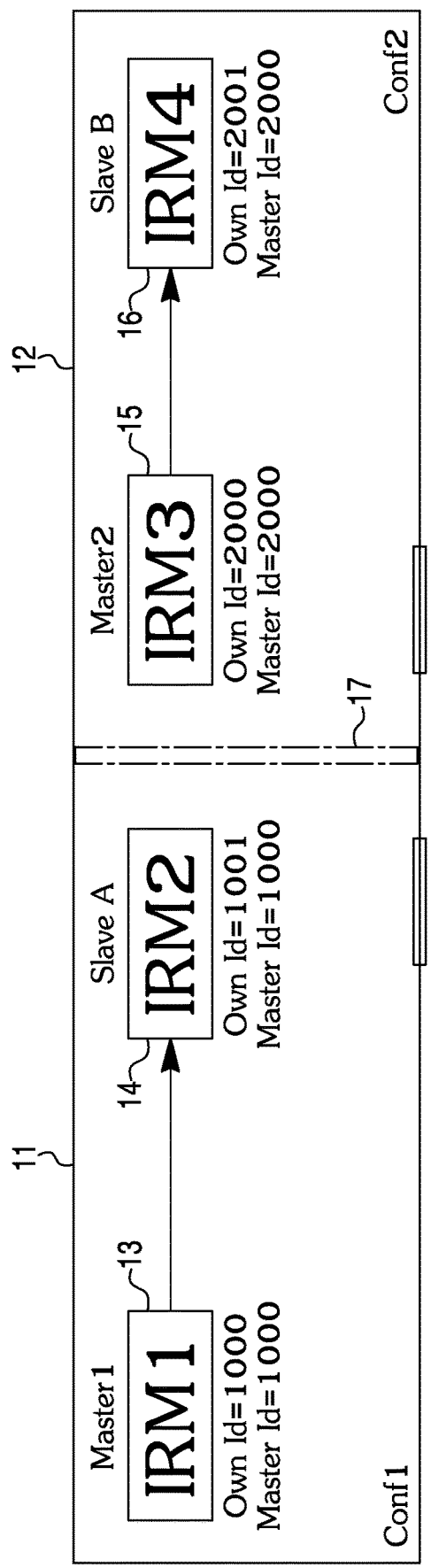
FIG. 1 is a diagram of conference rooms with controllers having a movable partition separating them.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Changing a layout of a zone/area in a building such as moving, adding or removing a door, increasing or splitting size of a room through movable walls, or by permanently removing partitions, changing offices to a conference room or vice versa, may be quite common during an operational phase of the building. The size of a room may be altered within a few minutes, according to customer demand. Whenever such changes happen, either a permanent change or temporary change, the HVAC characteristics of an affected space may vary. Air change rates, cooling and heating demands may vary. The variations may impact overall comfort of that zone.

The impact may demand a building automation system to adapt to the new conditions of the space dynamically either permanently or for a specified period of time. For example, there may be four conference rooms which are controlled by eight FCU units independently; when there is a need, these four conference rooms may be converted into a single big conference room by removing movable partitions. Fan coil unit (FCU) controllers that were controlling temperatures of these four conference rooms independently earlier, and now should work together to control this single big conference room. Otherwise, there may be chances that some FCU controllers will be detecting more heating requirements and heating the space, while others will be controlling for more cooling. This kind of simultaneous heating and cooling of the same space by different FCU controllers are not necessarily being energy efficient and may create discomfort in the zone.

Conventionally, any kind of permanent change in layout may be addressed by re-programming the controller through explicit point binding between the two application instances, and re-downloading into the controllers to suit new layout HVAC conditions. In some cases where temporary changes are required, commissioning engineer/building operators may have to intervene and change the HVAC configuration to suit target zones' HVAC demands. This may lead to more maintenance effort and less competitive solutions.

So one may need a building control system solution, which is flexible, and self-configurable and adaptable to the new layout changes based on the customer needs without demanding re-programming and re-configuration of the system. The system should avoid parallel heating and cooling in several areas that belong to the same zone. In the present approach, one may provide an automated/adaptive solution in a building controller to address these customer issues.

In the solution, every controller application instance may be responsible to control the temperature of a zone in the building, when many zones make up a room. For example, movable doors may be opened to join two conference rooms. Controllers may detect these changes automatically, do self-configuration, learn each other, and one of the instances in that room may become a master for controlling the room while all other instances may become slaves, and all of them together may control the space in a coordinated fashion. Sometimes, a user may explicitly trigger some of the application configuration changes (typically for permanent changes in the area) through commissioning tools. A controller may detect these changes and adapt to conditions without the need to change the application logic through engineering tools and re-downloading logic binaries into the controller.

In the present solution, every controller may run one or more plant instances (application instances). Every plant instance may carry its own identifier and master identifier. When both identifiers are the same, the plant instance may be running independently as a master. When the master identifier is different from its own identifier, then it may run as a slave. The slave may register itself to the master, and both may start learning an application context by each other.

In the present system, every input/output point and parameters that control application logic may have a unique point role information, which may provide a function of a point or parameter within the system. During the learning phase, the master and slave may exchange details of these point roles and data flow direction. For example, the master may inform the slave that it would be looking for space temperature information from the slave, and the slave may inform to the master that it would need effective setpoint information from it.

After the learning phase, the master and slave may start exchanging information based on a change of value or defined periodicity, and execute its application logic. This automatic learning through point roles does not necessarily require an explicit point binding between the master and slave controllers through programming/engineering tools.

In the present solution, a master application instance may receive values from different slave instances (a slave instance can be part of the same controller or can be from different controllers), and may perform a defined aggregation function (Average, Min, Max, Sum) for virtually all received values and provide a resultant effective data value to all slaves. For example, there may be an average value of room temperature received from different temperature sensors.

In another approach, one master may have several slaves. In more complex application types, there may be different control domains like HVAC, Lighting and Sunblind. It may even occur that the master for the HVAC domain is different from the master for the lighting domain. A slave may de-register itself from the master and register with another master based on changes in the zone.

In still another approach, a plant instance of a controller may detect changes in the zone through sensors connected to it. For example, a slave may detect that a room partition has been removed based on a switch sensor, and recognize that it should be acting as a slave from now on registering itself with the master. When the room partition is closed, it may detect again a switch contact position and de-register from the master to work as an independent master. As a control application may detect and make necessary changes automatically, and a field technician or building operator does not necessarily have to make any explicit configuration.

FIG. 1 is a diagram of a conference room 11 and a conference room 12. Rooms 11 and 12 may have a movable partition 17 separating them. Room 11 may be temperature controlled by FCU controllers 13 and 14. Controller 13 may be a master controller and controller 14 may be a slave controller. The temperature of room 12 may be controlled by FCU controllers 15 and 16. Controller 15 may be a master controller and controller 16 may be a slave controller.

Figure 2:
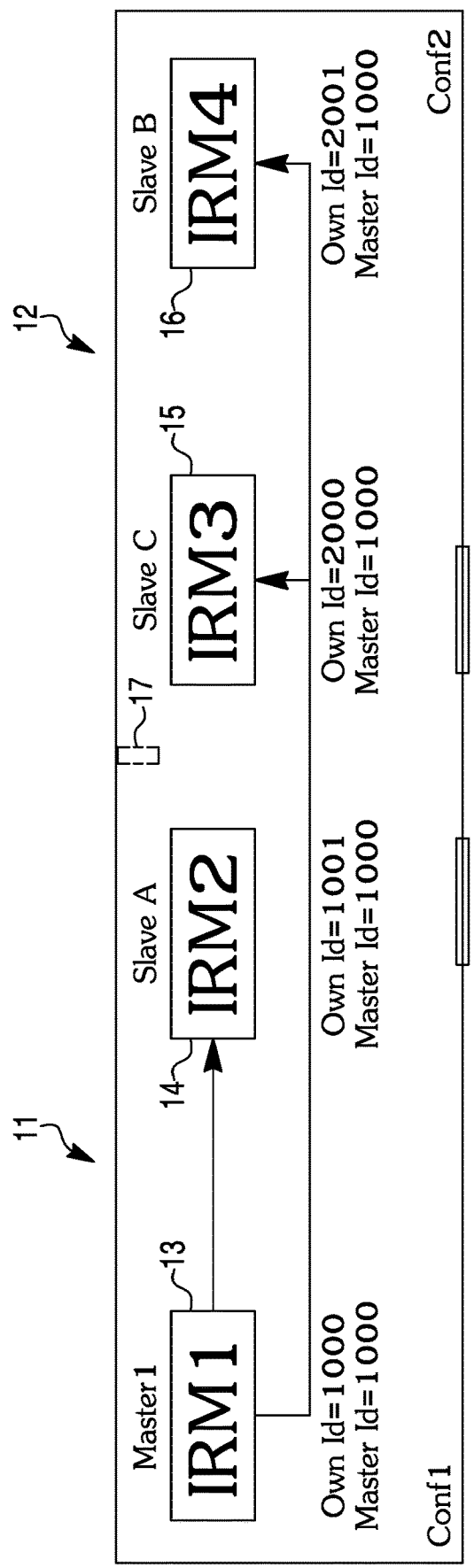
FIG. 2 is a diagram of conference rooms with controllers connected together as a single larger conference room by removing or folding in a movable partition.

In FIG. 2, a diagram shows that conference room 11 and conference room 12 may be connected together as a single larger conference room by removing or folding in the movable partition 17, at least on a temporary basis. Controllers 13, 14, 15 and 16 may have to control the temperature of overall space incorporating rooms 11 and 12 in a coordinated fashion. For instance, controller 13 may take the master role and controllers 14, 15 and 16 may act as slaves, automatically.

Figure 3:
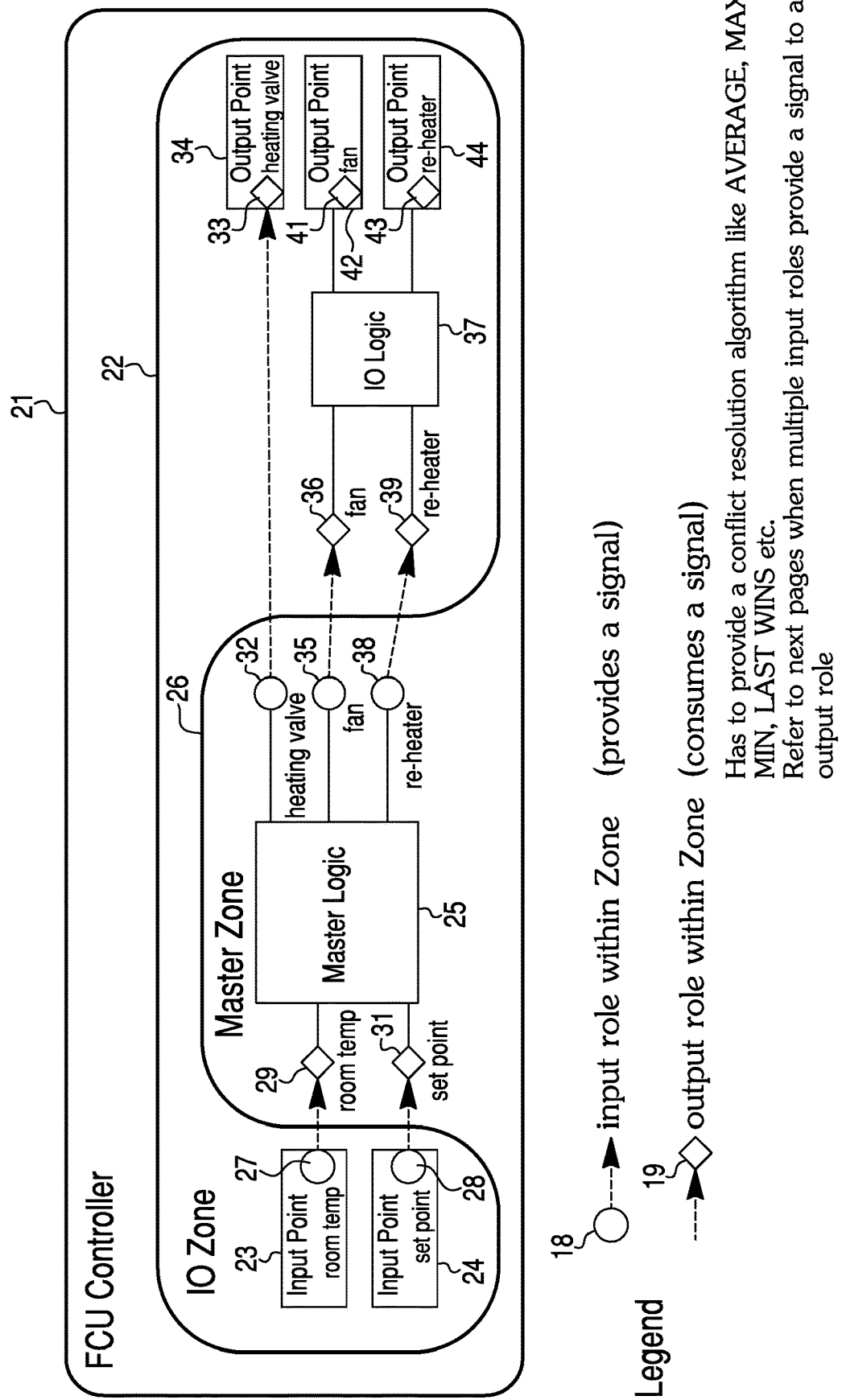
FIG. 3 is a diagram of fan coil unit controller that may illustrate a controller application principle

FIG. 3 is a diagram of fan coil unit controller 21 that may illustrate a controller application principle. An IO zone 22 may have an input point 23 for room temperature and an input point 24 for a setpoint. A circle symbol 18 with an outgoing dashed arrow may represent an input role within a zone, in that it provides a signal. A square or diamond symbol 19 with an incoming dashed arrow may represent an output role within a zone, in that it consumes a signal. Symbol 19 as an output role within a zone that consumes a signal should provide a conflict resolution algorithm like AVERAGE, MAX, MIN, LAST WINS, and so forth.

A room temperature signal may be provided from input point 23 as an input indicated by symbol 27 providing the signal, and symbol 29 as consuming the room temperature signal at a master logic module 25 in a master zone 26. A setpoint signal may be provided from input point 24 as an input as indicated by symbol 28 providing the signal and symbol 31 as consuming the setpoint signal at master logic module 25.

A heating valve signal may be provided at symbol 32 from master logic module 25 to an output point 34 via symbol 33 in IO zone 22. A fan signal may be provided at symbol 35 from module 25 to a symbol 36 that consumes the signal for IO logic module 37. A re-heater signal may be provided at symbol 38 from module 25 to a symbol 39 that consumes the signal for IO logic module 37. From logic module 37, the fan signal may be consumed by symbol 41 at output point 42. Also from module 37, the re-heater signal may be consumed by symbol 43 at output point 44.

Figure 4:
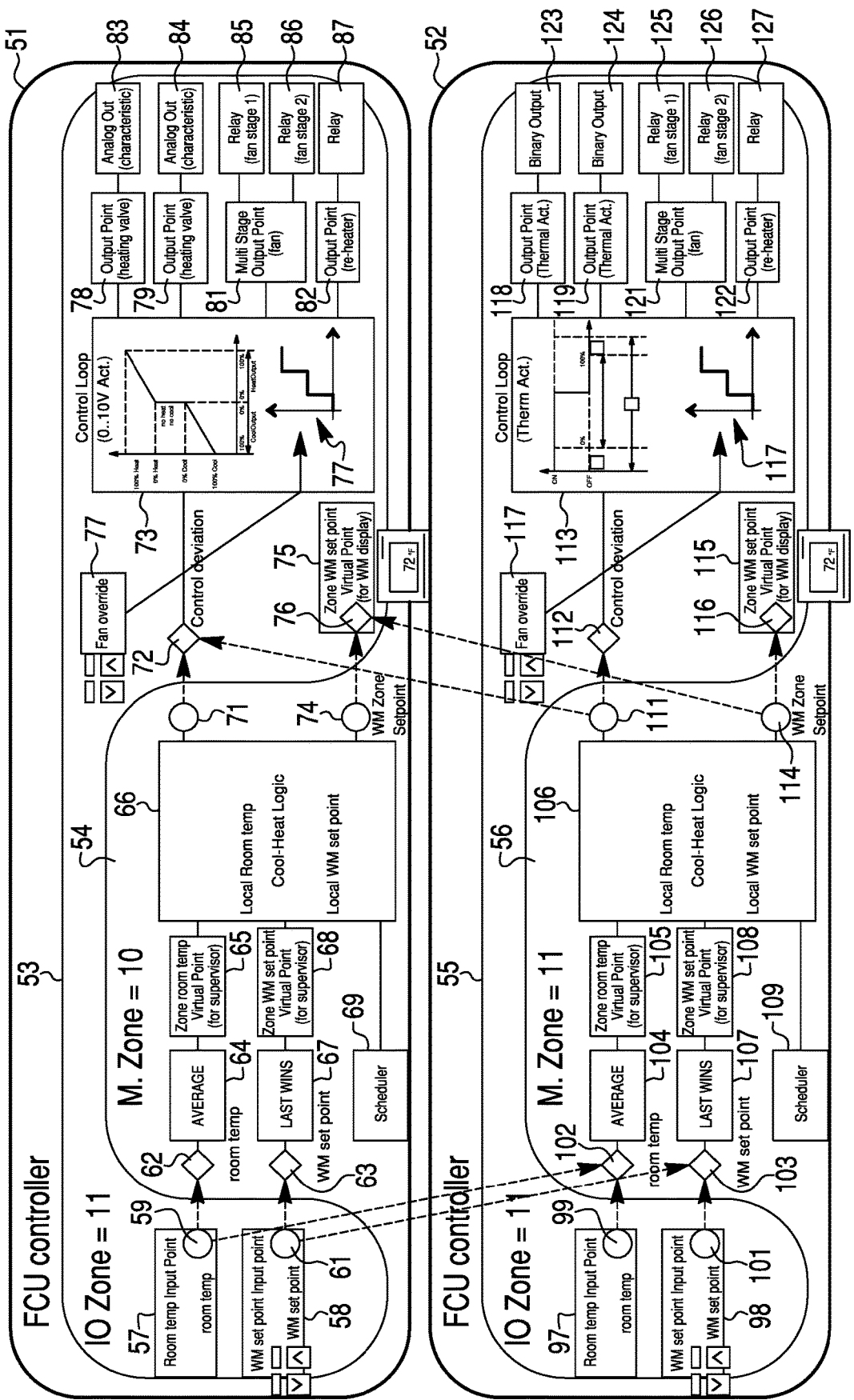
FIG. 4 is a diagram of fan coil unit controllers that may illustrate a master-slave principle.

FIG. 4 is a diagram of fan coil unit controllers 51 and 52 that may illustrate a master-slave principle. Controller 51 may have an IO zone 53 and a master zone 54. Controller 52 may have an IO zone 55 and a master zone 56. A room temperature input point 57 may have a room temperature signal provided as indicated by symbol 59 providing the signal, and symbol 62 as consuming the room temperature signal that goes through an AVERAGE algorithm 64 and a zone room temperature virtual point 65 (for a supervisor), and as a local room temperature to a cool-heat logic module 66.

A wall module setpoint input point 58 may have a wall module setpoint signal provided as indicted by symbol 61 providing the signal, and symbol 62 as consuming the wall module setpoint signal that goes through a LAST WINS algorithm 67 and a zone wall module setpoint virtual point 68 (for supervisor) as a local wall module setpoint at cool-heat logic module 66. A scheduler 69 may provide an input to logic module 66. A local room temperature signal may exit logic module 66 as provided by a symbol 71. A symbol 72 may receive and consume the signal as a control deviation signal may go from symbol 72 to a control loop (0 . . . 10V act) 73.

A wall module setpoint signal may exit logic module 66 as indicated by a symbol 74. A symbol 76 may receive and consume the setpoint signal and be a zone wall module setpoint virtual point 75 (for a wall module display).

Control loop 73 may have a fan override mechanism 77. From loop 73 may be an output point (heating valve) 78 connected to an analog out (characteristic) terminal 83, an output point (cooling valve) 79 connected to an analog out (characteristic) terminal 84, a multi stage output point (fan) 81 to a relay (fan stage 1) terminal 85 and a relay (fan stage 2) terminal 86, and an output point (re-heater) terminal 87.

Controller 52 may have an IO zone 55 and a master zone 56. A room temperature input point 97 may have a room temperature signal provided as indicated by symbol 98 providing the signal, and symbol 102 as consuming the room temperature signal that goes through an AVERAGE algorithm 104 and a zone room temperature virtual point 105 (for a supervisor), and as a local room temperature to a cool-heat logic module 106.

A wall module setpoint input point 58 may have a wall module setpoint signal provided as indicated by symbol 101 providing the signal, and symbol 102 as consuming the wall module setpoint signal that goes through a LAST WINS algorithm 107 and a zone wall module setpoint virtual point 108 (for supervisor) as a local wall module set point at cool-heat logic module 106. A scheduler 109 may provide an input to logic module 106. A local room temperature signal may exit logic module 106 as provided by a symbol 111. A symbol 112 may receive and consume the signal. A control deviation signal may go from symbol 112 to a control loop (thermal act) 113.

A wall module setpoint signal may exit module 106 as provided by a symbol 114. A symbol 116 may receive and consume the setpoint signals and be a zone wall module setpoint virtual point 115 (for a wall module display).

Control loop 113 may have a fan override mechanism 117. From loop 113 may be an output point (thermal act.) 118 connected to a binary output terminal 123, an output point (thermal act.) 119 connected to a binary output terminal 124, a multi stage output point (fan) 121 to a relay (fan stage 1) terminal 125 and a relay (fan stage 2) terminal 126, and an output point (re-heater) terminal 127.

Several connections between controller 51 and controller 55 may illustrate the master slave principle as applied to the controllers. Symbol 102 of controller 52 may consume a room temperature signal provided by symbol 59 of controller 51. Symbol 103 of controller 52 may consume a wall module setpoint signal provided by symbol 61 of controller 51. Symbol 72 of controller 51 may consume a local room signal provided by symbol 111 of controller 52. Symbol 76 of controller 51 may consume a wall module setpoint signal provided by symbol 114 of controller 52.

Figure 5:
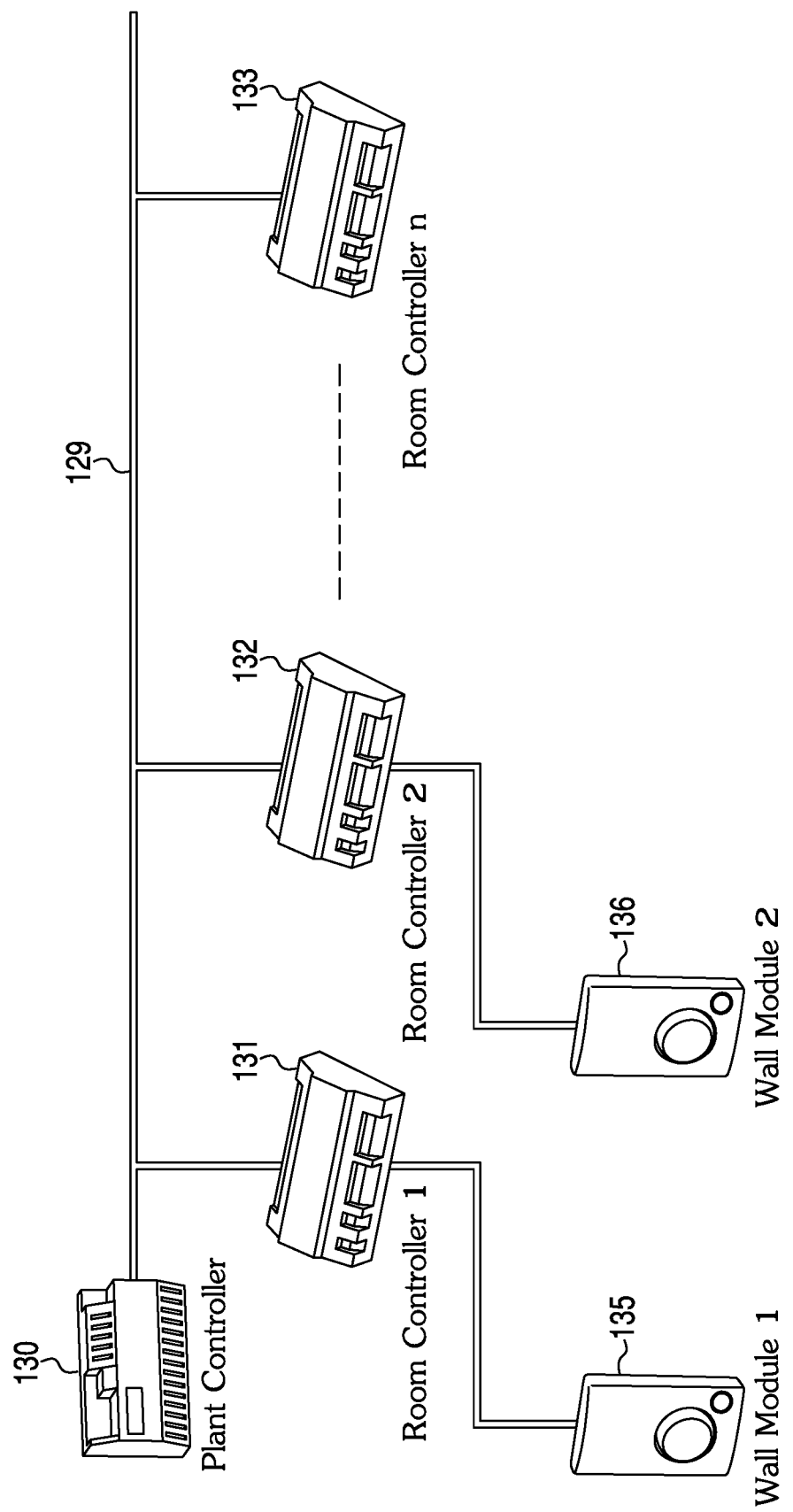
FIG. 5 is a diagram of an illustrative physical network connection that may be made for a master-slave layout.

FIG. 5 is a diagram of an illustrative physical network connection that may be made for a master-slave layout. A plant controller 130 may be connected to a BACnet MS/TP network 129. Room controllers 131, 132 and 133 may be connected to network 129. There may be additional controllers connected to network 129. Plant controller 130 may be the master and the other controllers connected to network 129 may be the slaves. Each of the controllers may have a controller connected to it such as wall modules 135 and 136 connected to controllers 131 and 132, respectively.

Figure 6:
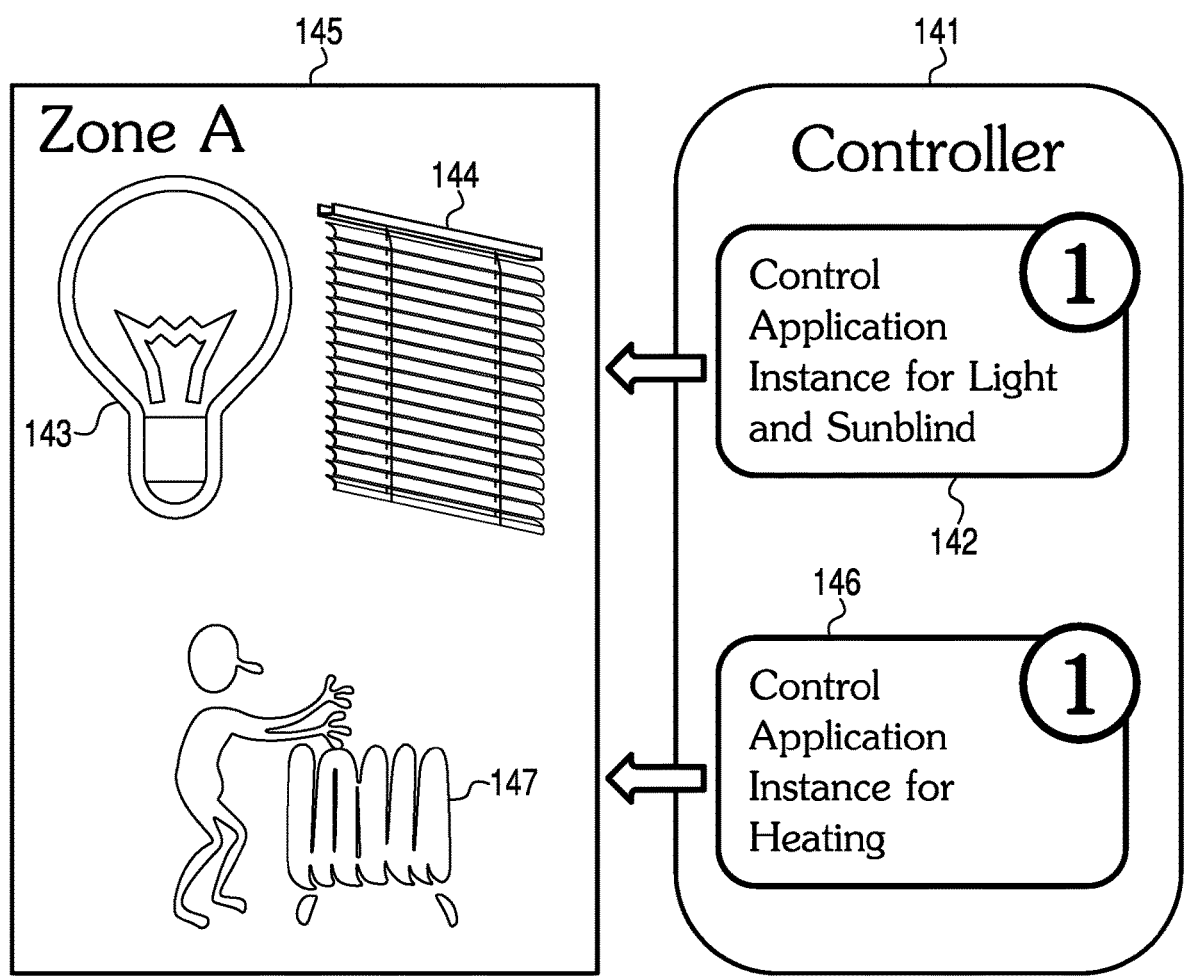
FIG. 6 is a diagram showing a relationship of an instance of one control application type and an instance another control application type in a zone.

FIGS. 6-10 are diagrams of scenarios for relationships between control application types and control application instances. FIG. 6 is a diagram showing a relationship of an instance one of a control application type "light and sunblind" and an instance one of a control application type "heating" controlling "zone A". For example, a controller 141 may provide a control application instance 142 for a light 143 and a sunblind 144 at a zone 145. Controller 141 may also provide a control application instance 146 for heating 147 at zone 145.

Figure 7:
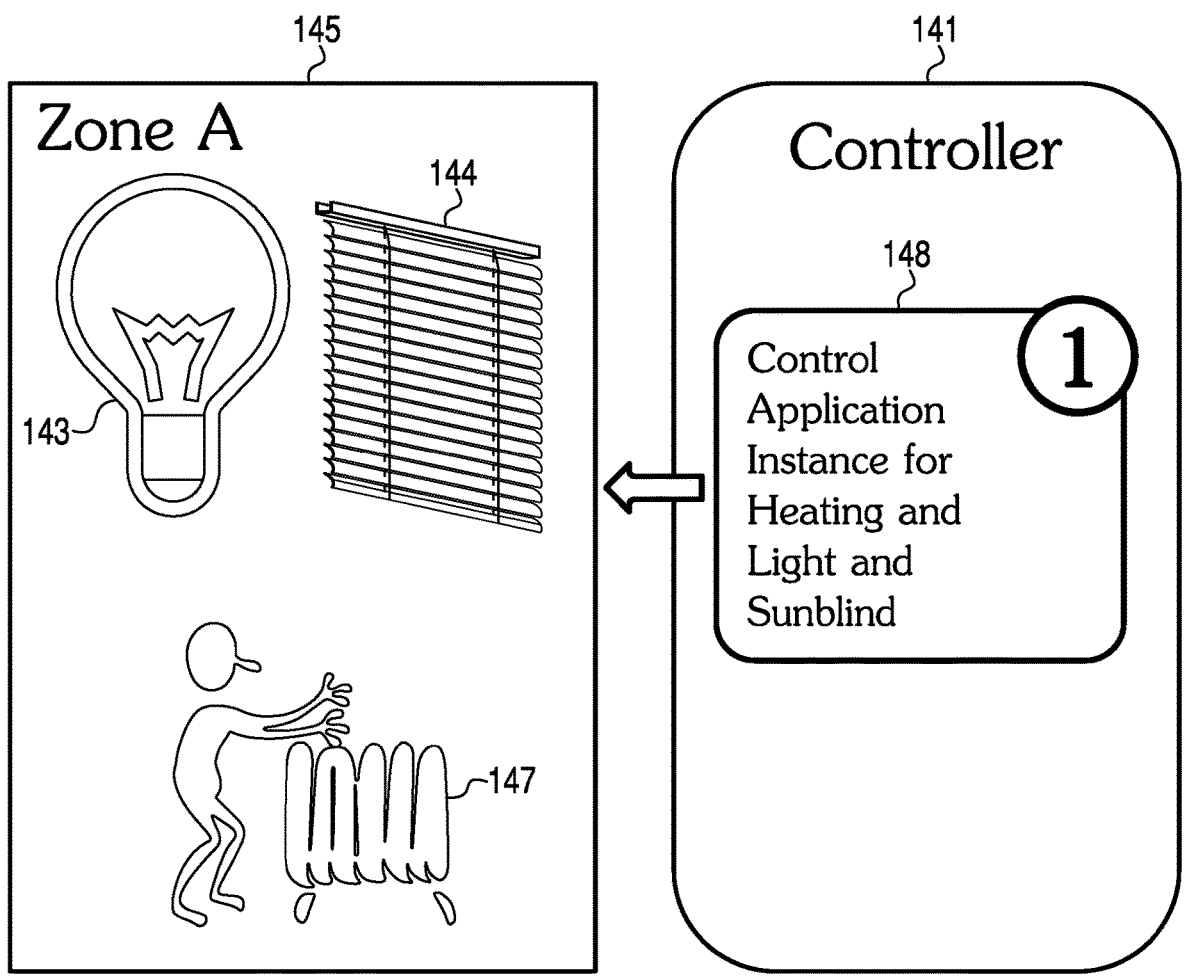
FIG. 7 is a diagram showing a relationship of an instance of several control application types in a zone.

FIG. 7 is a diagram showing a relationship of an instance one of a control application type "heating and light and sunblind" controlling "zone A". For example, controller 141 may provide a control application instance 148 for heating 147 and light 143 and sunblind 144 at zone 145.

Figure 8:
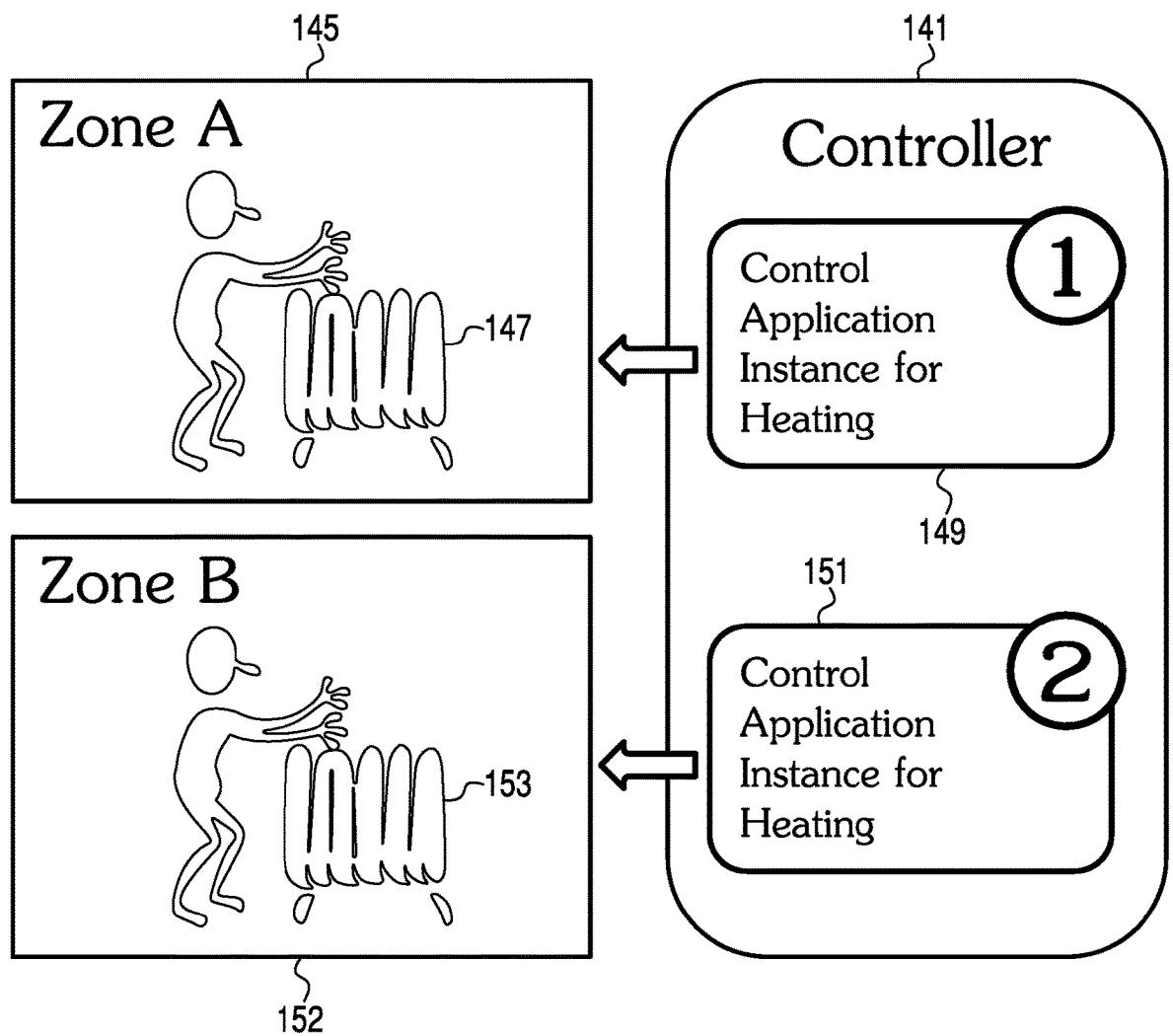
FIG. 8 is a diagram showing a relationship of an instance of one control application type for a zone and plus an instance a control application type in another zone.

FIG. 8 is a diagram showing a relationship of an instance one of a control application type "heating" controlling "zone A" plus an instance two of a control application type "heating" controlling "zone B". For example, controller 141 may provide a control application instance 149 for heating 147 at zone 145 and provide a control application instance 151 for heating 153 at a zone 152.

Figure 9:
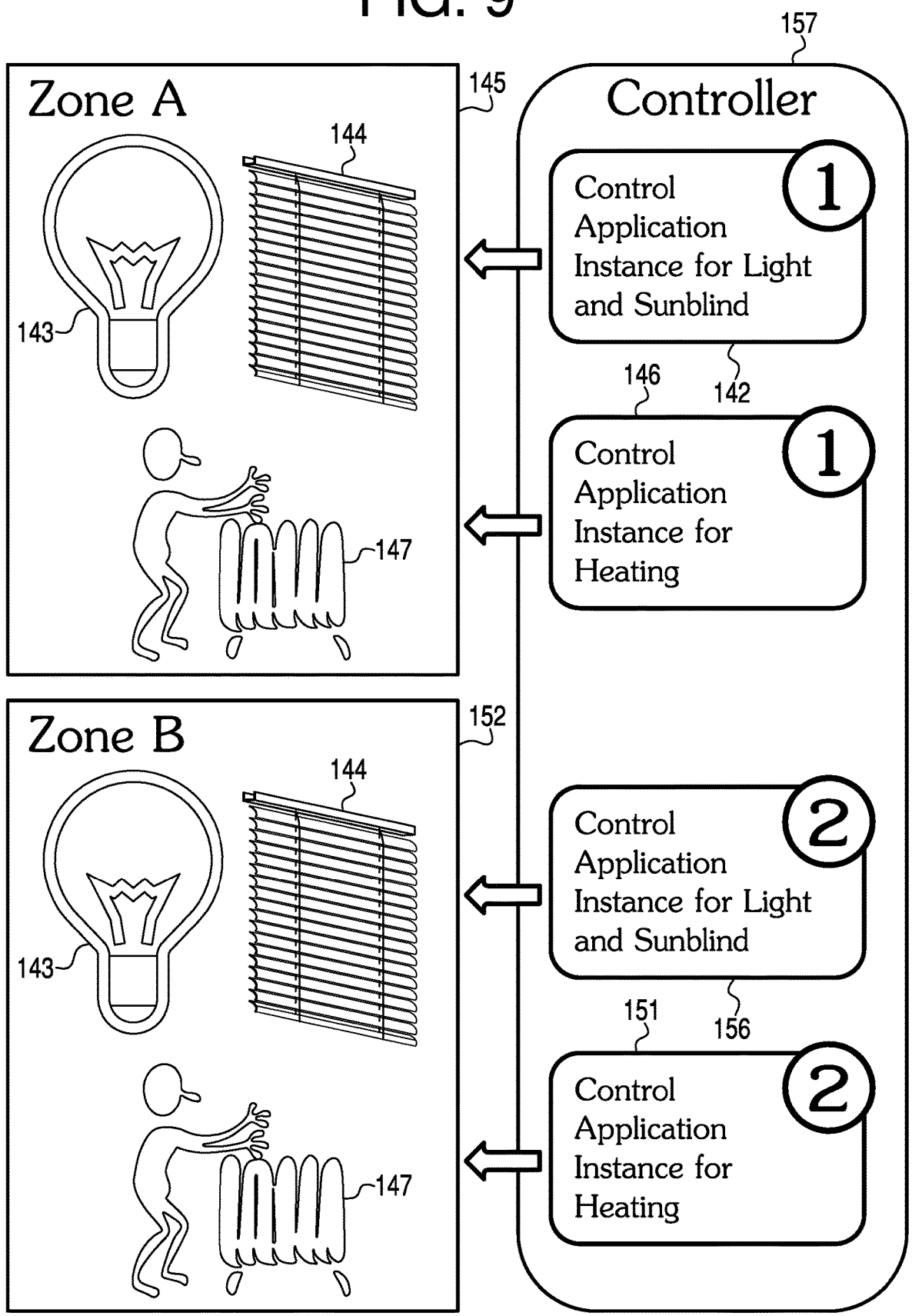
FIG. 9 is a diagram showing an instance of two control application types for one zone and an instance of two control application types for another.

FIG. 9 is a diagram showing an instance one of a control application type "heating" controlling "zone A" plus an instance one of control application type "light and sunblind" controlling "zone A", an instance two of control application type "heating" controlling "zone B" plus an instance two of control application type "light and sunblind" controlling "zone B". For example, a controller 157 may provide a control application instance 142 for light 143 and sunblind 144 at zone 145, a control application instance 146 for heating at zone 145, a control application instance 156 for light 143 and a sunblind 144 at zone 152, and a control application instance 151 for heating 147 at zone 152.

Figure 10:
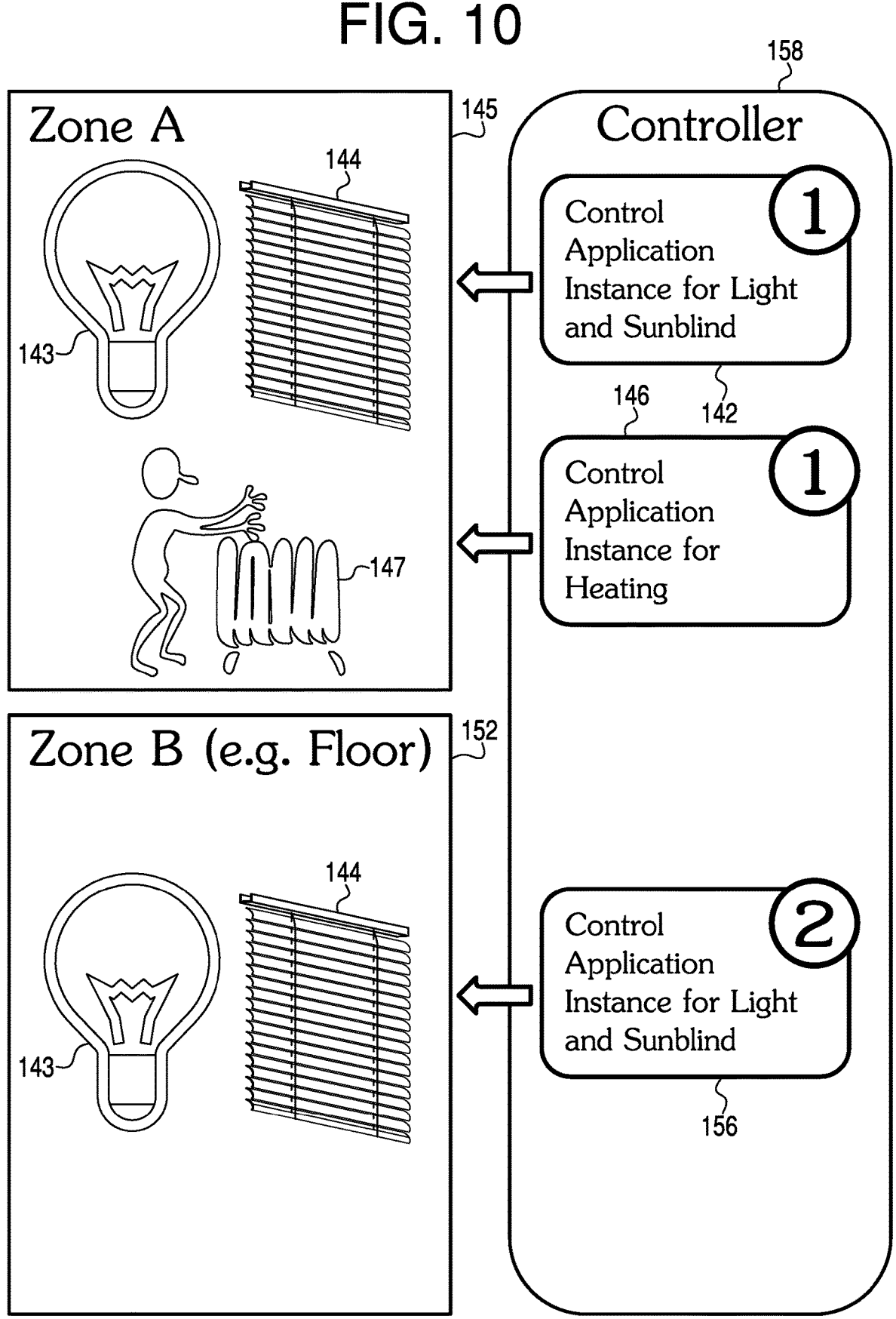
FIG. 10 is a diagram showing an two instances of a control application type for one zone and an instance a control application type for another zone.

FIG. 10 is a diagram showing an instance one of a control application type "heating" controlling "zone A" plus an instance one of a control application type "light and sunblind" controlling "zone A", and an instance two of a control application type "light and sunblind" controlling "zone B" e.g., a floor. For example, a controller 158 may provide a control application instance 142 for light 143 and sunblind 144 at zone 145, a control application instance 146 for heating at zone 145, and a control application instance 156 for light 143 and sunblind 144 at zone 152.

Figure 11:
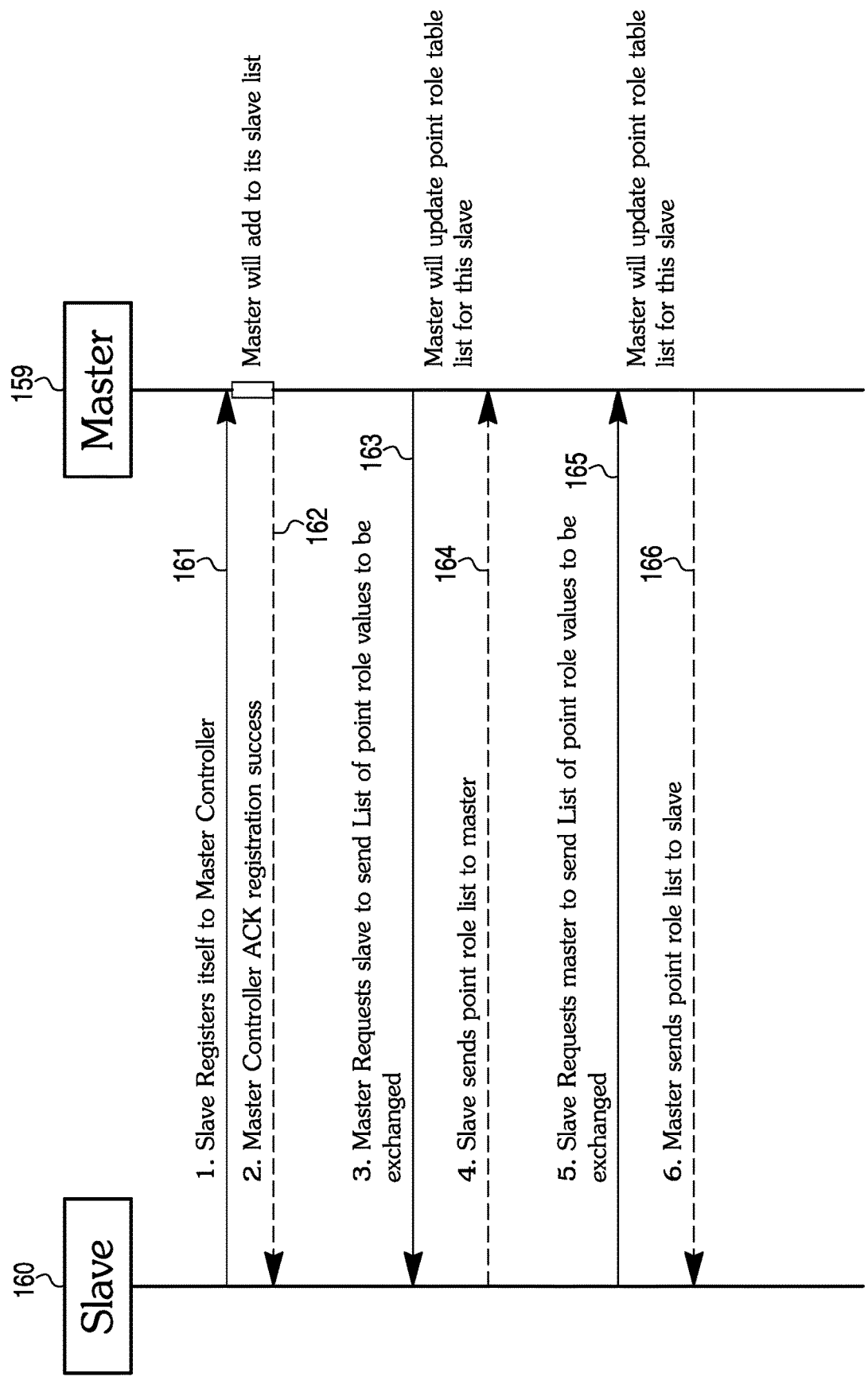
FIG. 11 is a diagram of a learning phase workflow between a master controller and a slave controller.

FIG. 11 is a diagram of a learning phase workflow between a master controller (master) 159 and a slave controller (slave) 160. Various communications 161-166 may occur between master 159 and slave 160, as represented by solid lines (message) and dash lines (response) with arrows indicating directions of the communications. At communication 161, slave 160 may register itself to master 159. Master 159 may add slave 160 to its slave list. Master 159 may acknowledge (ACK) a registration success via a communication 162 to slave 160. Master 159 may request in a communication 163 that slave 160 send a list of point role values to be exchanged to master 159. Master 159 may update a point role table list for slave 160. In a response 164, slave 160 may send a point role list to master 159. Slave 160 may ask in a request 165 that master 159 send a list of point role values to be exchanged. Master 159 may update the point role table list for this slave 160. Master 159 may, in a response 166, send a point role list to slave 160.

Figure 12:
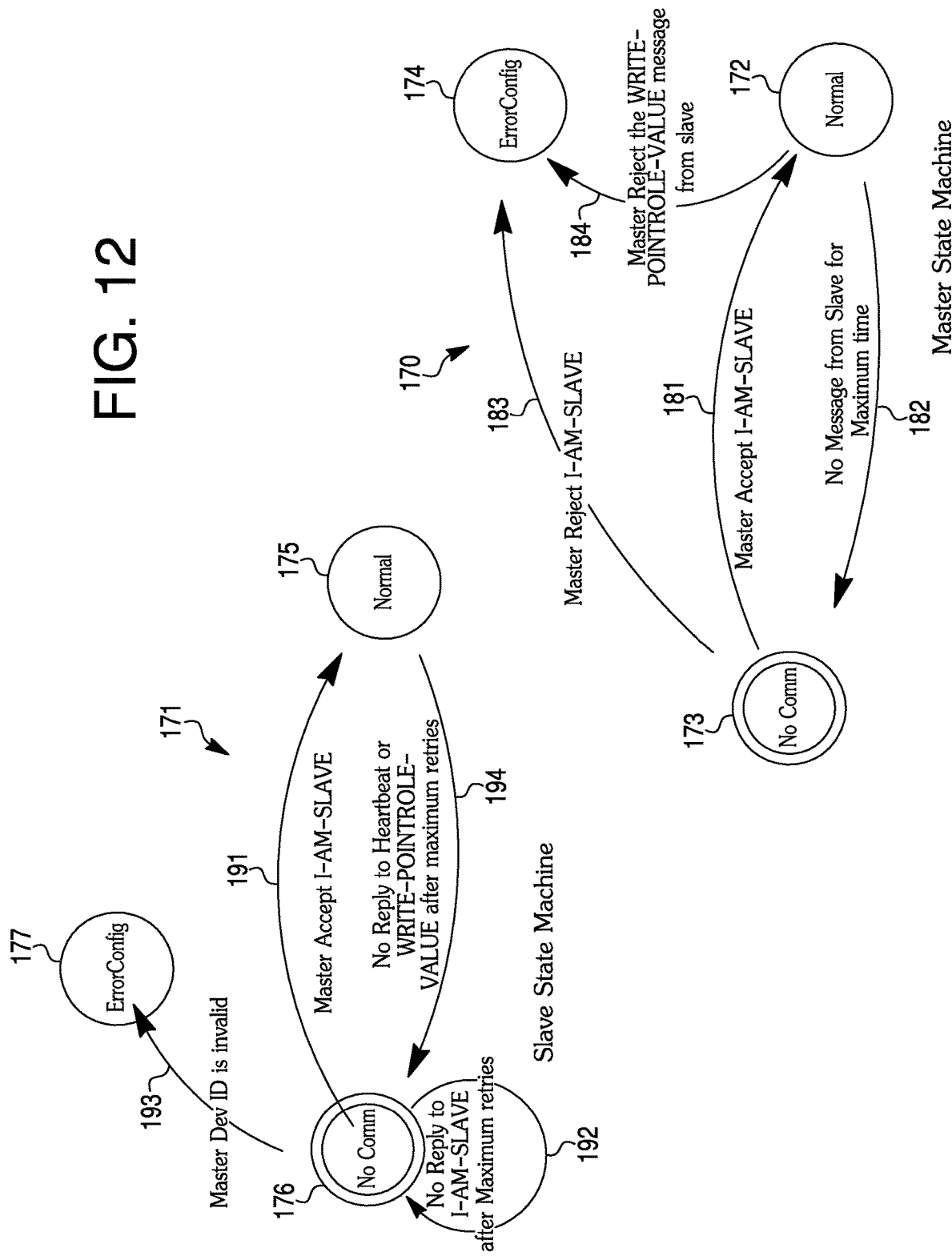
FIG. 12 is a diagram of a slave state machine and a master state machine during a learning phase.

FIG. 12 is a diagram of a slave state machine 171 and a master state machine 170 during a learning phase. A slave may indicate to a master that it is a slave. Several results may occur. One may be that the master accepts "I am slave" as indicated by transitions 181 and 191 for normal states 172 and 175 to occur for the master state machine 170 and the slave state machine 171, respectively. There may be no reply to "I am slave" after maximum retries at action 192 of no comm state 176. There may be no message from the slave for maximum time at transition 182 from normal state 172 to no comm state 173 of the master. If a master dev ID is invalid, then there may be a transition from no comm state 176 to an error config state 177 of the slave. The master "reject I am slave" may be of transition 183 from no comm state 173 to error config 174 of the master. A master "reject the write-point role-value from the slave" may be of a transition 184 from normal state 172 to an error config state 174 of the master. A no reply to heartbeat or write-point role value after maximum retries may be of a transition 194 from normal state 175 to no comm state 176 of the slave.

Figure 13:
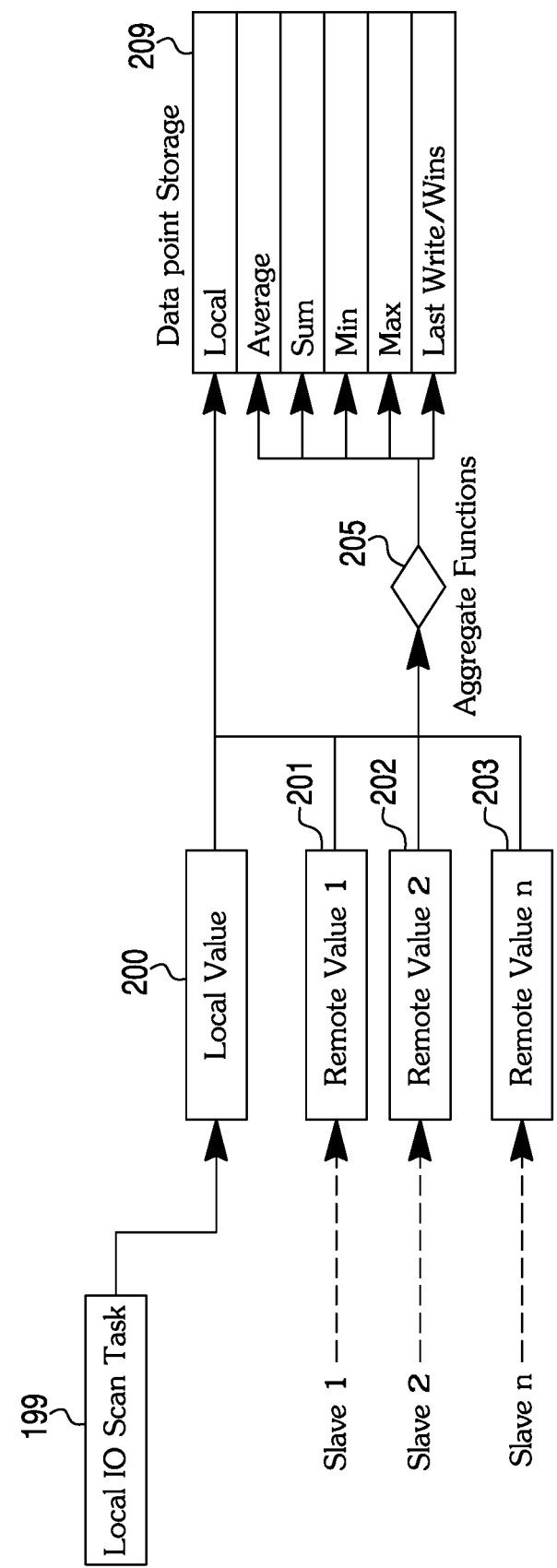
FIG. 13 is a diagram of a point value exchange and aggregate calculation in a master controller.

FIG. 13 is a diagram of a point value exchange and aggregate calculation in a master controller. A local IO scan task 199 may provide a local value 200. A first slave may provide a first remote value 201, a second slave may provide a second remote value 202, and so on. A last or nth slave may provide an nth remote value 203. Values 200, 201, 202, 203 and any in-between values may go to an aggregate functions mechanism 205. Local value 200 may also go to a local input of a data storage device 209 of the master controller. An output of mechanism 205 may go to inputs of average, sum, min, max and last write/wins of storage device 209. A present value of a data point may be a local value or an aggregate function based on a configuration of the master controller.

Figure 14:
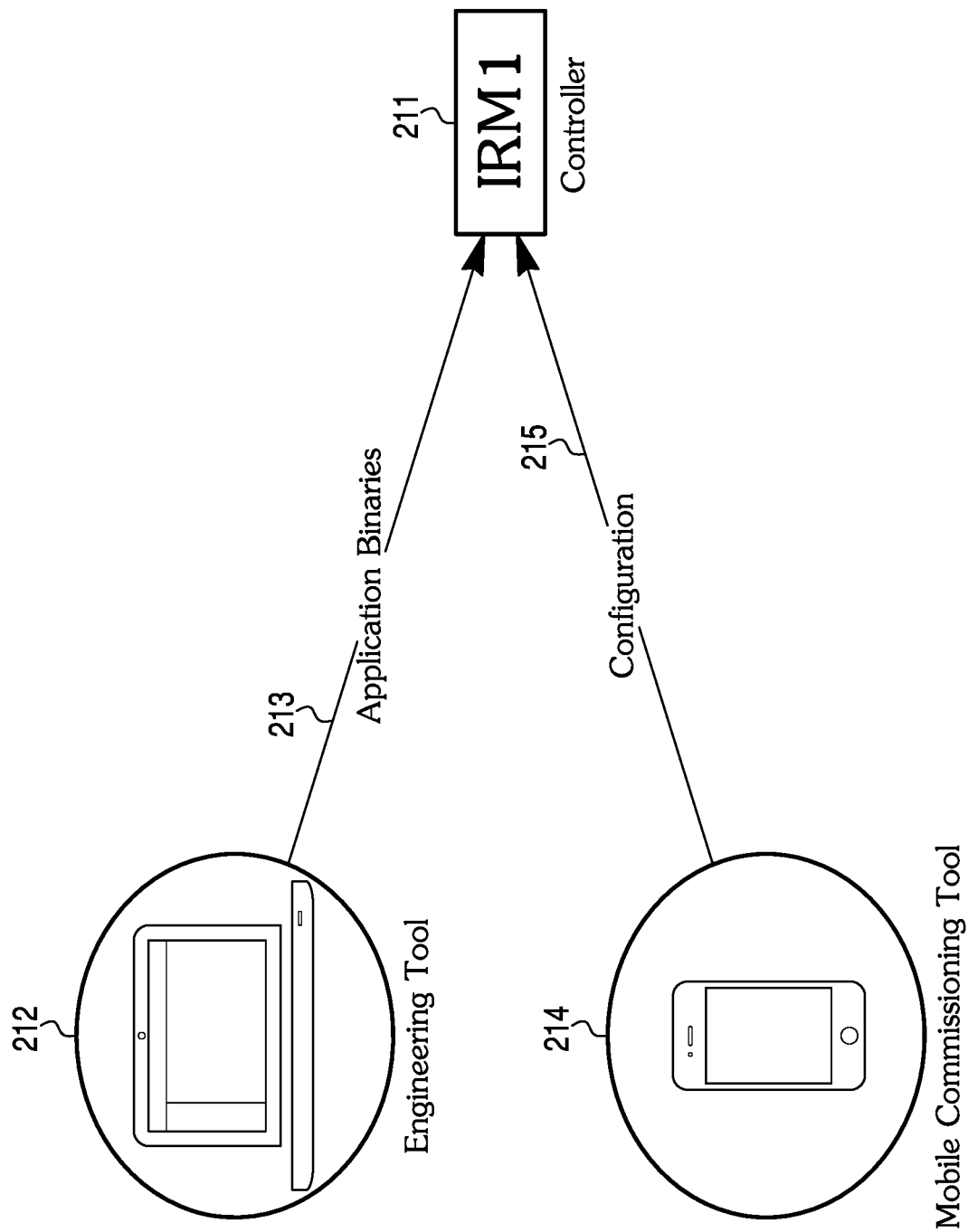
FIG. 14 is a diagram of tool communications to a controller.

FIG. 14 is a diagram of tool communications to a controller 211. An engineering tool 212 may provide application binaries 213 to controller 211. A mobile commissioning tool 214 may provide a configuration 215 to controller 211.

To recap, a master-slave controller system may incorporate one or more controllers in one or more spaces. Two or more spaces may be reducible to fewer spaces or one or more spaces are increasable to two or more spaces. If two or more spaces are combined into a smaller number, including one, of spaces, then virtually all of the one or more controllers in each of the smaller spaces may be combined into a master-slave relationship for each of the smaller number of spaces. If one or more spaces are split into a larger number of spaces, then for each space there is one or more controllers and a master-slave relationship that may exist for each space which has two or more controllers.

Each group of controllers may have a master controller. Each controller may have an own ID and a master ID. If an own ID of a controller is dissimilar from the master ID, then the controller may be a slave. If an own ID of a controller is the same as the master ID of the controller, then the controller may be a master.

When two or more spaces are combined into a smaller number of spaces, the controllers of the combined spaces may be automatically connected into a master-slave relationship.

When one or more spaces are split into a larger number of spaces, then the master-slave relationship may be automatically implemented for each space that has two or more controllers.

The two or more spaces may be combined with one another by removal of one or more partitions or walls. If any of the one or more partitions or walls is opened or removed, a combining of the two spaces may result in a larger space having two or more controllers. A sensor may detect an opening or a removal of the one or more partitions or walls for the combining of the two spaces. A signal from the sensor may go to the controllers of the larger space which selects one controller to be a master and a remaining one or more controllers to be slaves.

The one or more spaces may be split into one or more additional spaces with one or more partitions or walls. A sensor may detect a splitting of the one or more spaces into one or more spaces with one or more partitions or walls. A signal from the sensor may go to the controllers of the resulting spaces, which selects one controller to be a master and remaining one or more controllers of each space that has two or more controllers, to be slaves.

A slave-master relationship may incorporate a learning phase, a point value exchange, and an aggregate calculation and an exchange of calculated value by a master.

The learning phase may incorporate a slave registering with a master, the master adding the slave to a slave list, the master requesting the slave to send a list of point role values to be exchanged, the slave sending the list of point role values to the master, the master updating the list of point role values of the slave, the slave requesting the master to send a list of point role values to be exchanged, the master updating the list of the point role values for the slave, and the master sending the list of the point role values to the slave.

The point-value exchange may incorporate a local points value from the master to a data point storage and to an aggregate function mechanism, a first remote value from a first slave to the aggregate function mechanism, and an nth remote value from an nth slave to the aggregate function mechanism. nth may refer to virtually any or all of 2nd through nth remote values from 2nd through nth slaves, respectively, to the aggregate function mechanism. The aggregate function mechanism may provide an output of an average, a sum, a minimum, a maximum or last write/wins to the data point storage.

The master may incorporate the aggregate function mechanism and the data point storage.

The controllers may provide control of the spaces for one or more conditions selected from a group incorporating temperature, lighting, sun-blinds and security.

An approach for master-slave configuring may incorporate combining two or more spaces, each space having at least one controller, into one or more resulting spaces, selecting one controller of each resulting space as a master, and connecting remaining one or more controllers of each resulting space as slaves to the master. The combining the two or more spaces into the one or more resulting spaces may be detected by a sensor. A signal from the sensor detecting the combining the two or more spaces may go to an interface circuit connected to controllers of a resulting space to automatically implement selecting a controller of each resulting space as a master and configuring remaining one or more controllers of each resulting space as slaves of the master.

The controllers may manage one or more parameters of the spaces. The one or more parameters may be selected from a group incorporating temperature, lighting, sun-blinds, and security.

Each controller may run one or more application instances. Each application instance may have its own identifier and a master identifier. When a master identifier and an own identifier of an application instance are different, then the application instance may run as a slave. When a master identifier and an own identifier of an application instance are the same, then the application instance may run as a master.

The approach may further incorporate reversing the combining two or more spaces into previously uncombined two or more spaces. The reversing the combining the two or more spaces may be detected by the sensor and a signal may go from the sensor to the interface circuit to automatically return the controllers to their previous slave and master configurations that were present just prior to the combining the two or more spaces.

Each master may have a set of one or more slaves for each control domain. One or more control domains may be selected from a group incorporating HVAC control domains, lighting domains, sun-blind domains, and security domains.

The one controller of each resulting space selected as a master may cover a first control domain. Another controller of each resulting space selected as a master may cover a second control domain.

Additional controllers of each resulting space may be selected as masters that cover additional control domains respectively. One or more control domains may be selected from a group of domains incorporating temperature, lighting, sun-blinds and security.

A master-slave arrangement may incorporate one or more rooms, and one or more controllers for controlling a parameter in each of the one or more rooms. Any of the two or more rooms may be combinable into one or more larger rooms. Upon combining the two or more rooms into one or more larger rooms, the one or more controllers for controlling a parameter in each of the two or more rooms may be automatically connected as slave controllers and a master controller.

The arrangement may further incorporate a detector situated in at least one or more rooms of the two or more rooms being combined into one or more larger rooms, and an interface circuit connected to the detector and the controllers of the one or more rooms being connected. The detector may sense a combining of the two or more rooms into one or more larger rooms and provide a signal indicting the combining to the interface circuit. The interface circuit may effect one controller to be a master and remaining controllers to be slaves, of the one or more larger rooms.

The parameter may be selected from a group incorporating temperature, lighting, sun blocking, and security.

A largeness of a room may be determined by floor area.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system comprising:
    at least one sensor for detecting partitions between at least three spaces; and
    three or more controllers operatively coupled to the at least one sensor and each controller from the three or more controllers is configured to: manage one or more parameters for a space from the at least three spaces;
    provide instructions for managing the one or more parameters, when in a master state, to another controller from the three or more controllers that shares the space, wherein the space is shared when a partition is not detected by the at least one sensor;
    accept instructions for managing the one or more parameters, when in a slave state, from a different controller from the three or more controllers that shares the space, wherein the different controller is in the master state; and
    wherein a first controller from the three or more controllers is configured to enter the master state and a second and a third controller from the three or more controllers is configured to enter the slave state based on the three or more controllers sharing the space.

2. The system of claim 1, wherein the first controller is configured to enter the master state and the second controller is configured to enter the slave state based on the first controller and the second controller sharing the space.

3. The system of claim 2, wherein the first controller is configured to enter the master state and the third controller is configured to enter the slave state based on the first controller and the third controller sharing the space.

4. The system of claim 3, wherein the second controller is configured to enter the master state and the third controller is configured to enter the slave state based on the second controller and the third controller sharing the at least one space.

5. The system of claim 4, wherein each controller from the three or more controller has a unique identifier and each controller is further configured to compare their unique identifier with a master identifier and enter the master state when their unique identifier matches the master identifier and enter the slave state when their unique identifier does not match the master identifier.

6. The system of claim 5, wherein, when in the slave state, each controller is further configured to register to the different controller that is in the master state and enter a slave-master relationship incorporates:
    a learning phase;
    a point value exchange; and
    an aggregate calculation and an exchange of calculated value by a master.

7. The system of claim 6, wherein the learning phase comprises:
    the master adding the slave to a slave list;
    the master requesting the slave to send a list of point role values to be exchanged;
    the slave sending the list of point role values to the master;
    the master updating the list of point role values of the slave;
    the slave requesting the master to send a list of point role values to be exchanged;
    the master updating the list of the point role values for the slave; and
    the master sending the list of the point role values to the slave.

8. The system of claim 6, wherein the point-value exchange comprises:
    a local points value from the master to a data point storage and to an aggregate function mechanism;
    a first remote value from a first slave to the aggregate function mechanism; and
    an nth remote value from an nth slave to the aggregate function mechanism; and
    wherein:
    nth refers to virtually all of 2nd through nth remote values from 2nd through nth slaves, respectively, to the aggregate function mechanism; and
    the aggregate function mechanism provides an output of an average, a sum, a minimum, a maximum or last write/wins to the data point storage.

9. The system of claim 8, wherein the master comprises the aggregate function mechanism and the data point storage.

10. The system of claim 1, wherein the one or more parameters for the space are selected from a group comprising temperature, lighting, sun-blinds and security.

\* \* \* \* \*